US012708103B2

(12) United States Patent
Ferguson

(10) Patent No.: US 12,708,103 B2
(45) Date of Patent: Aug. 18, 2026

(54) SHOCK COLLAR SYSTEM

(71) Applicant: Calvin Ferguson, Biloxi, MS (US)

(72) Inventor: Calvin Ferguson, Biloxi, MS (US)

( * ) Notice: Subject to any disclaimer, the term of this patent is extended or adjusted under 35 U.S.C. 154(b) by 222 days.

(21) Appl. No.: 18/598,903

(22) Filed: Mar. 7, 2024

(65) Prior Publication Data

US 2025/0280793 A1 Sep. 11, 2025

(51) Int. Cl.
*A01K 15/02* (2006.01)

(52) U.S. Cl.
CPC .................................. *A01K 15/023* (2013.01)

(58) Field of Classification Search
CPC .. A01K 15/023; A01K 27/009; A01K 15/021; A01K 15/04; A01K 27/006; A01K 27/001
See application file for complete search history.

(56) References Cited

U.S. PATENT DOCUMENTS 5,067,441 A 11/1991 Weinstein
D376,553 S 12/1996 Heun
5,617,814 A * 4/1997 Bianco ................. A01K 15/023 119/720
5,787,841 A * 8/1998 Titus .................... A01K 15/023 119/721
5,872,516 A * 2/1999 Bonge, Jr. ............ A01K 15/023 340/552
6,116,192 A * 9/2000 Hultine ................ A01K 27/009 119/908
6,657,544 B2 * 12/2003 Barry ................... A01K 15/023 340/573.3
7,117,822 B1 * 10/2006 Peinetti ................ A01K 15/023 340/573.3
9,125,381 B2 9/2015 Gurley
9,247,714 B1 * 2/2016 Tait ........................ A01M 29/16
9,277,734 B1 3/2016 Paradis
9,818,286 B2 * 11/2017 Wilson ................. A01K 27/006
10,149,460 B1 * 12/2018 Lill ....................... A01K 29/005
10,492,470 B1 * 12/2019 Silverman ............ A01K 11/006
10,743,520 B2 8/2020 Van Curen
11,246,292 B2 * 2/2022 Devaney ................ A01K 15/02
2015/0342149 A1 * 12/2015 Lutz ..................... A01K 27/001 119/859

FOREIGN PATENT DOCUMENTS

CA 2051740 6/1992

* cited by examiner

*Primary Examiner* — Yvonne R Abbott-Lewis

(57) ABSTRACT

A gateway passage prevention system for dissuading an animal from passing through doorways and other gateways includes a shock collar configured to be worn by the animal and a sensor module for mounting to a wall or other support surface near a doorway or other passageway. The sensor module detects when the shock collar approaches the doorway and causes the shock collar to electrically shock the animal in order to dissuade the animal from passing through the doorway.

8 Claims, 8 Drawing Sheets

SHOCK COLLAR SYSTEM

(B) CROSS-REFERENCE TO RELATED APPLICATIONS

Not Applicable

(C) STATEMENT REGARDING FEDERALLY SPONSORED RESEARCH OR DEVELOPMENT

Not Applicable

(D) THE NAMES OF THE PARTIES TO A JOINT RESEARCH AGREEMENT

Not Applicable

(E) INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

(F) STATEMENT REGARDING PRIOR DISCLOSURES BY THE INVENTOR OR JOINT INVENTOR

Not Applicable

(G) BACKGROUND OF THE INVENTION

(1) Field of the Invention

The disclosure relates to shock collars and more particularly pertains to a new shock collar for dissuading an animal from passing through doorways and other gateways.

(2) Description of Related Art Including Information Disclosed Under 37 CFR 1.97 and 1.98.

The prior art discloses various shock collar systems for training an animal to remain within a predetermined area. However, the prior art fails to describe such a system which detects motion of the animal near a gateway such as a doorway, a hallway, or the like, and which trains the animal to avoid passing through the gateway by shocking the animal.

(H) BRIEF SUMMARY OF THE INVENTION

An embodiment of the disclosure meets the needs presented above by generally comprising a shock module which includes a collar configured to mount to a neck of an animal. An electric shock member is mounted on an interior side of the collar. A collar processor is operatively coupled to the electric shock member and is programmed to selectively deliver electric shocks to the electric shock member. A collar power supply is electrically coupled to the collar processor, and a collar transceiver is operably coupled to the collar processor.

A sensor module is provided which comprises a housing configured to mount to a support surface proximate to a gateway. The housing houses a sensor transceiver and a sensor processor. The sensor transceiver is mounted in the housing and is in wireless communication with the collar transceiver. The sensor processor is operatively coupled to the sensor transceiver and is configured to detect a motion of the collar transceiver with respect to the sensor transceiver within a predetermined range of the sensor transceiver. The sensor processor is programmed to cause the sensor transceiver to transmit an operational signal to the collar processor via the collar transceiver to activate the electric shock member when the motion of the collar transceiver is detected.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

(I) BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

(J) DETAILED DESCRIPTION OF THE INVENTION

Figure 1:
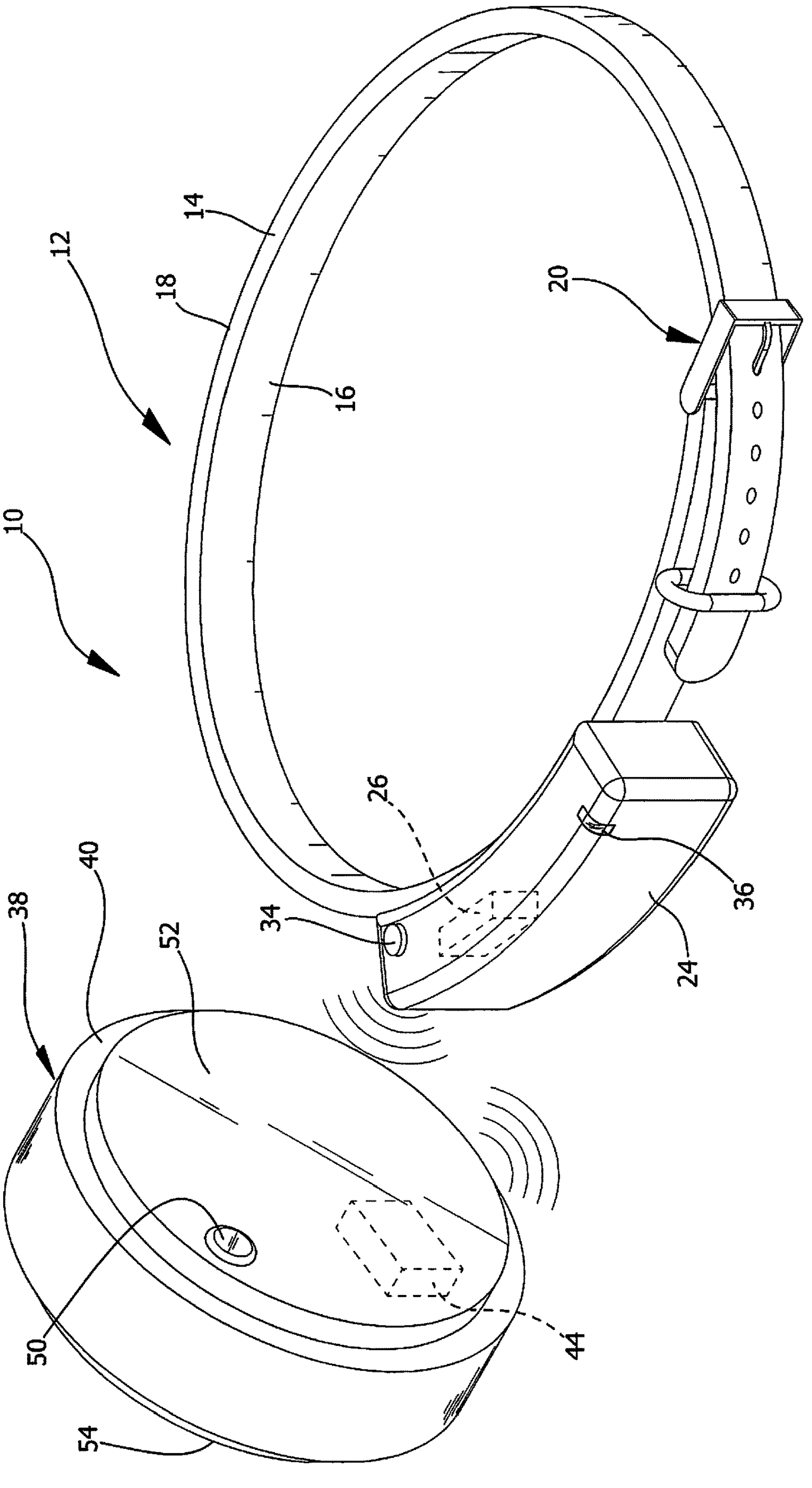
FIG. 1 is a kit view of a gateway passage prevention system according to an embodiment of the disclosure.
Figure 2:
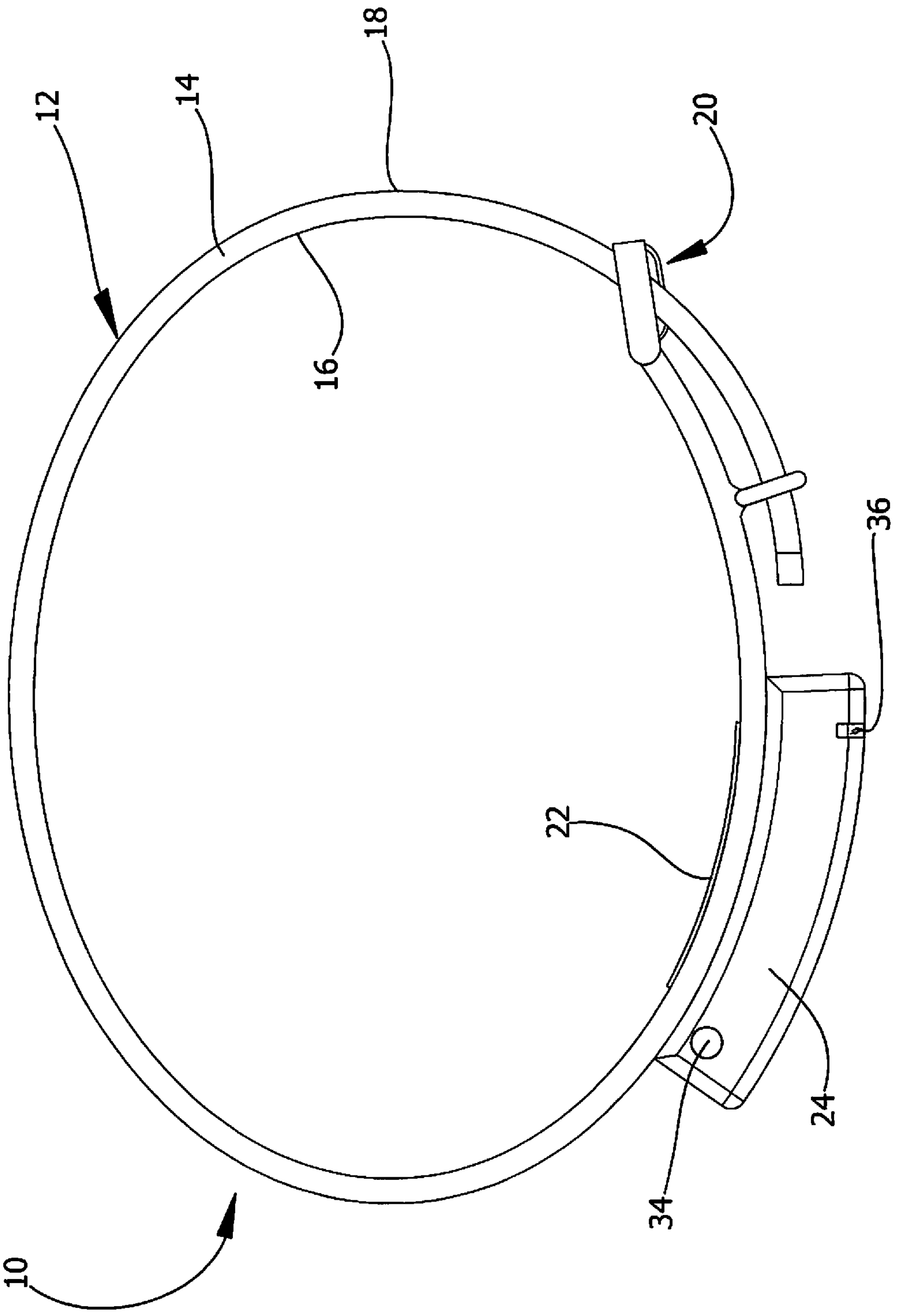
FIG. 2 is a top view of a shock module of an embodiment of the disclosure.
Figure 3:
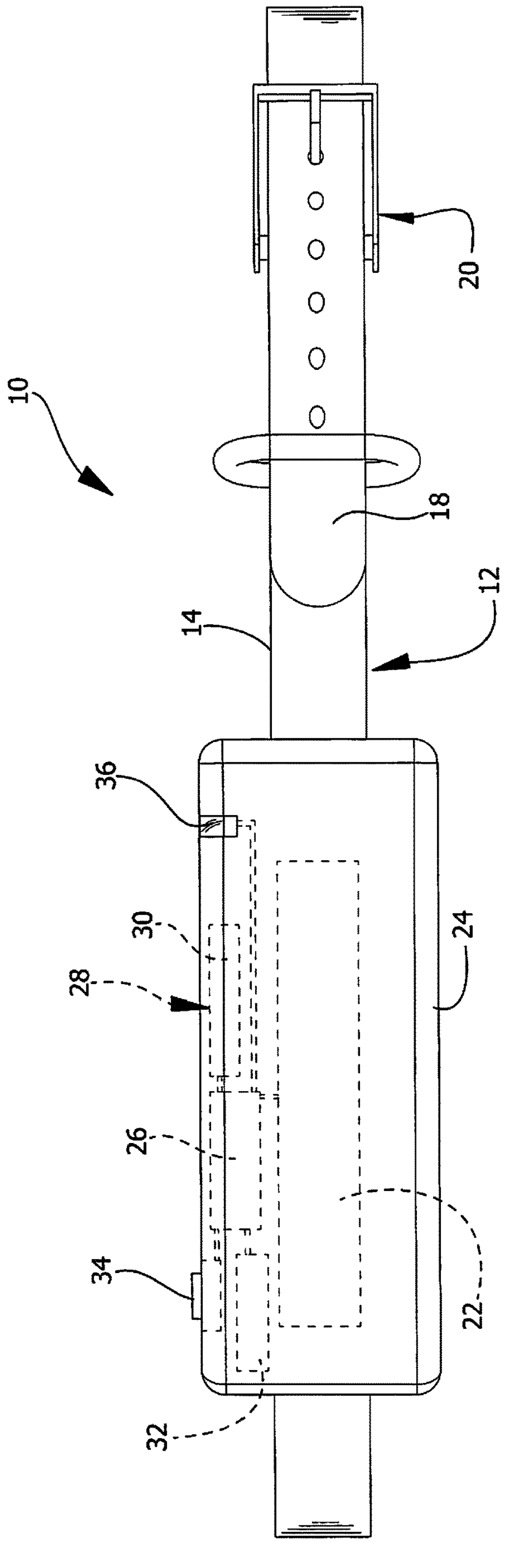
FIG. 3 is a front view of a shock module of an embodiment of the disclosure.
Figure 4:
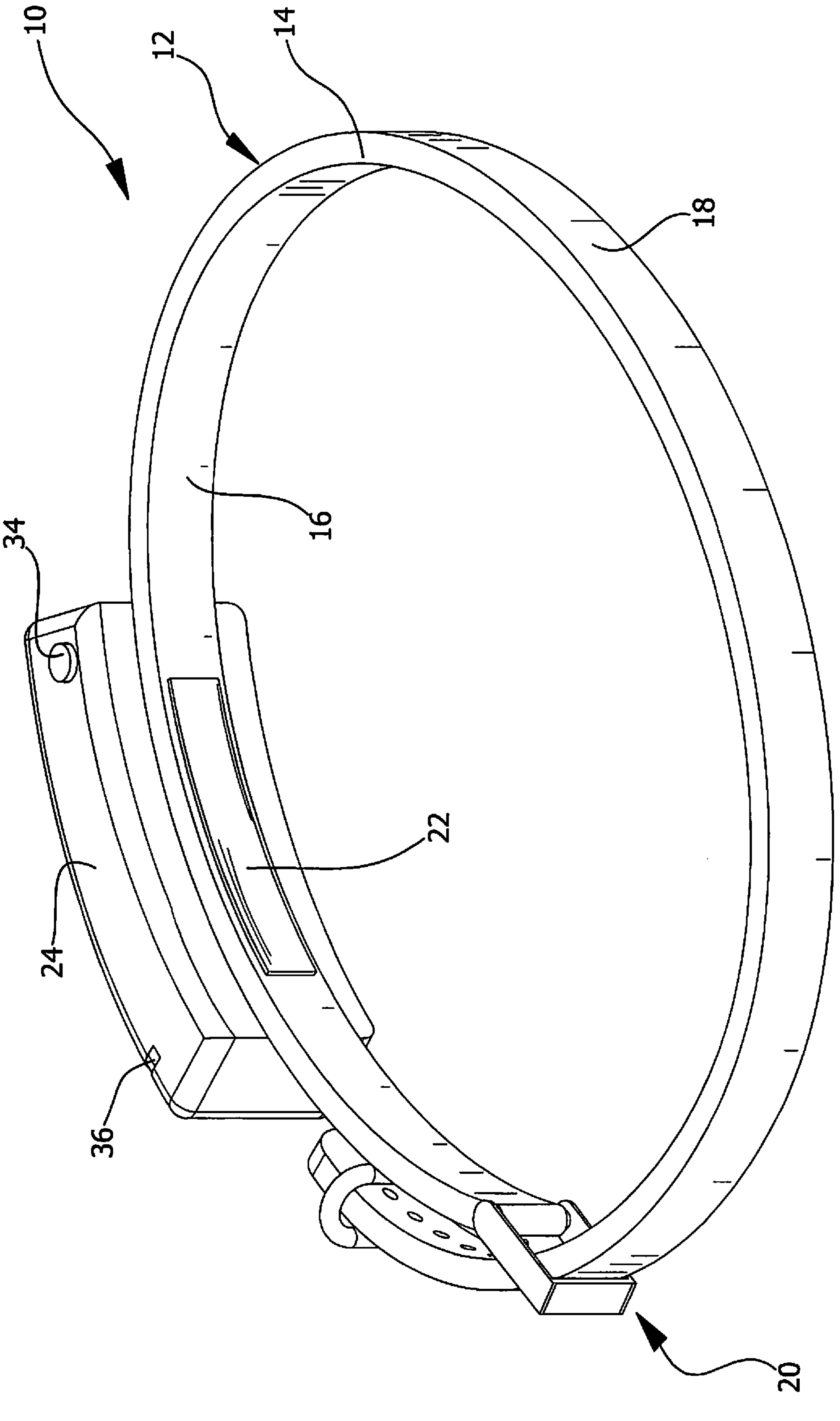
FIG. 4 is a perspective view of a shock module of an embodiment of the disclosure.
Figure 5:
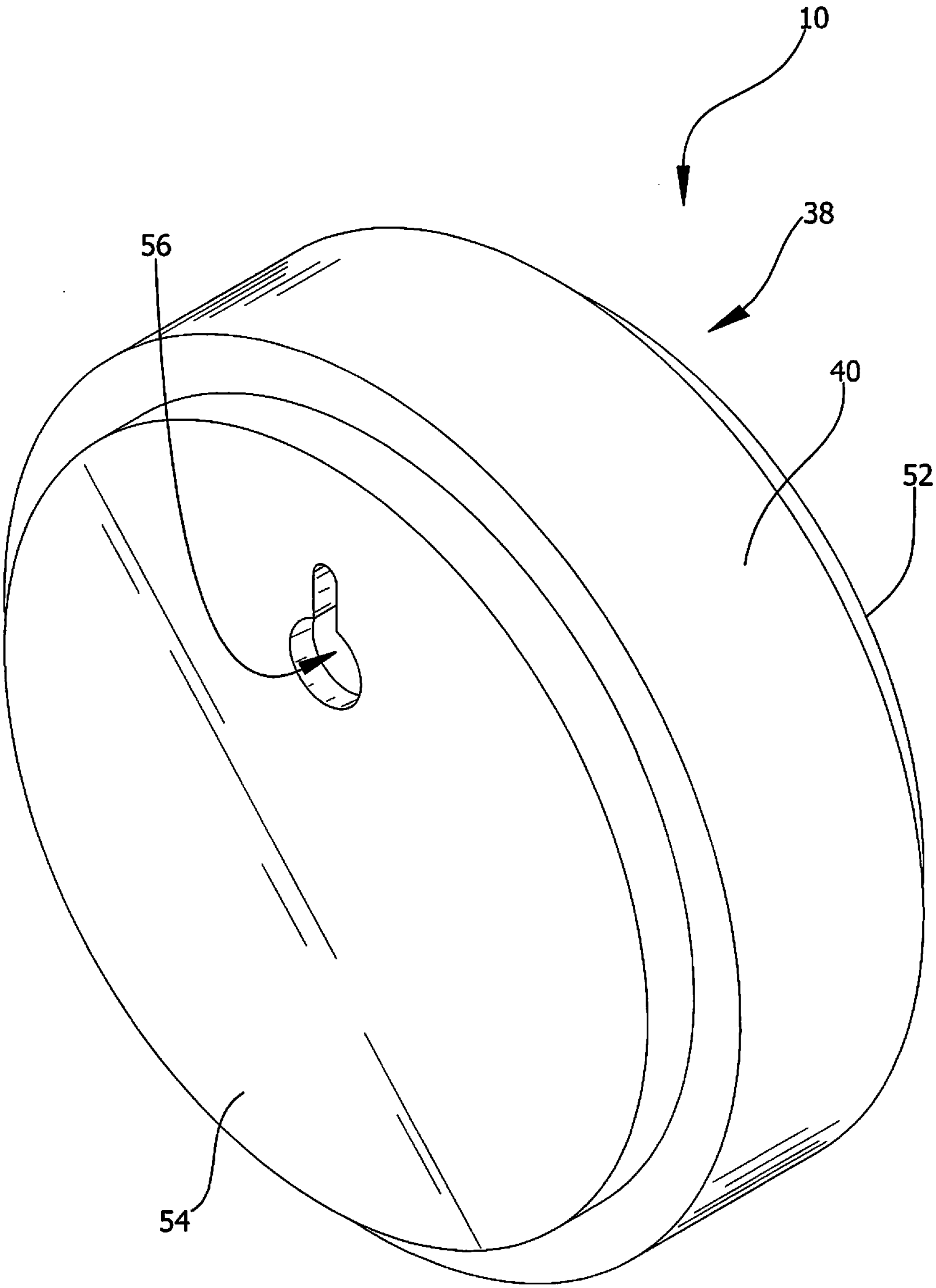
FIG. 5 is a rear perspective view of a sensor module of an embodiment of the disclosure.
Figure 6:
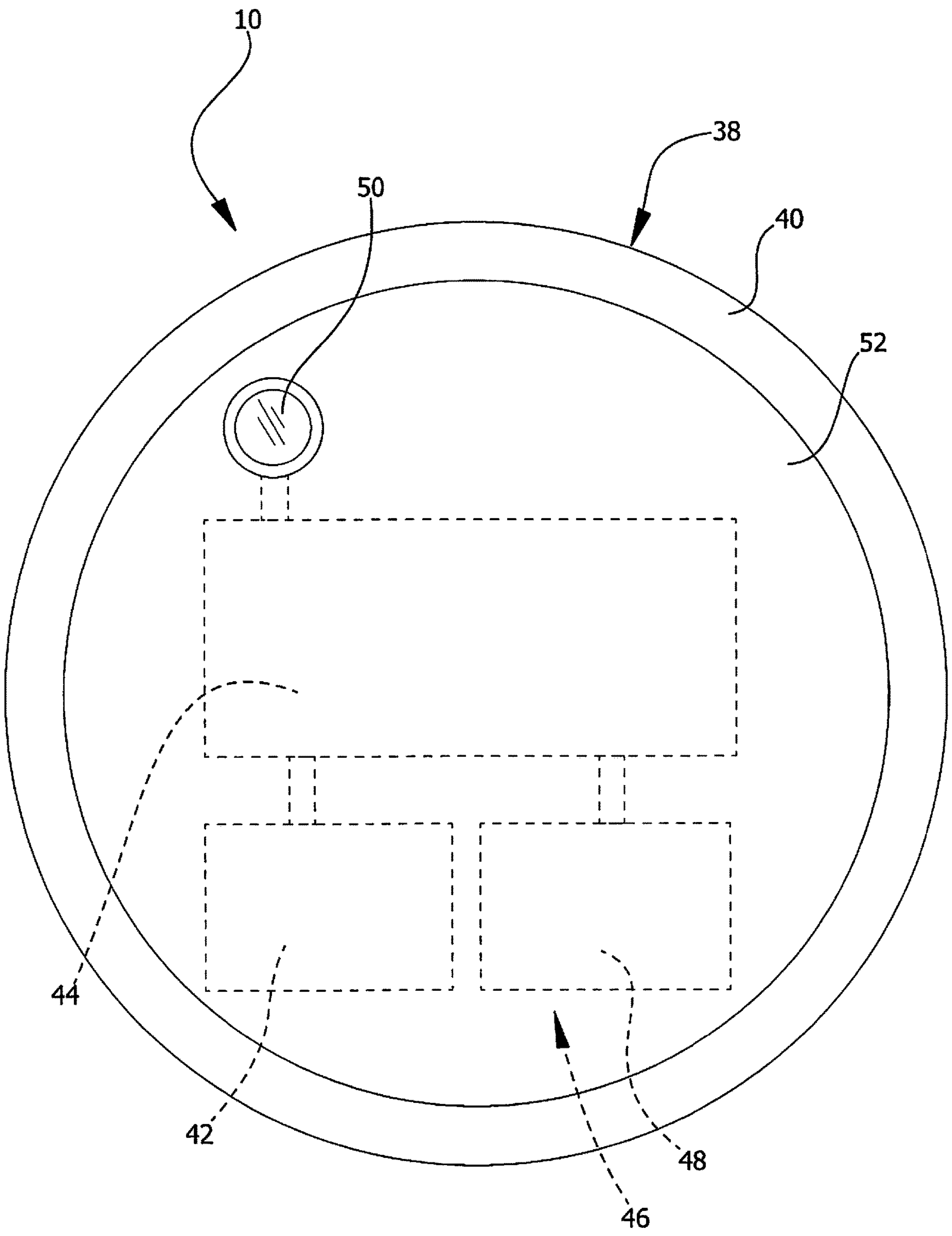
FIG. 6 is a front view of a sensor module of an embodiment of the disclosure.
Figure 7:
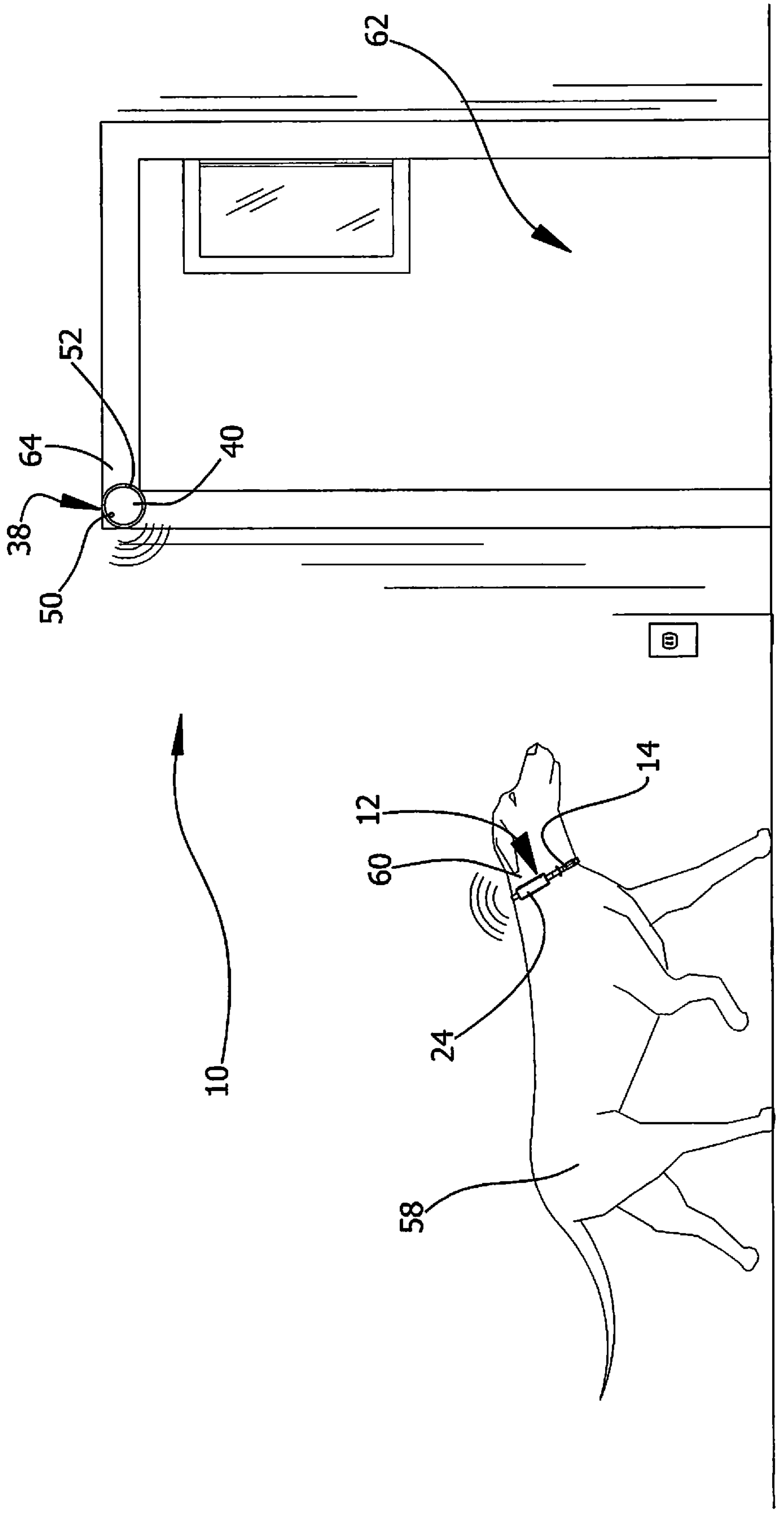
FIG. 7 is an in-use view of an embodiment of the disclosure.
Figure 8:
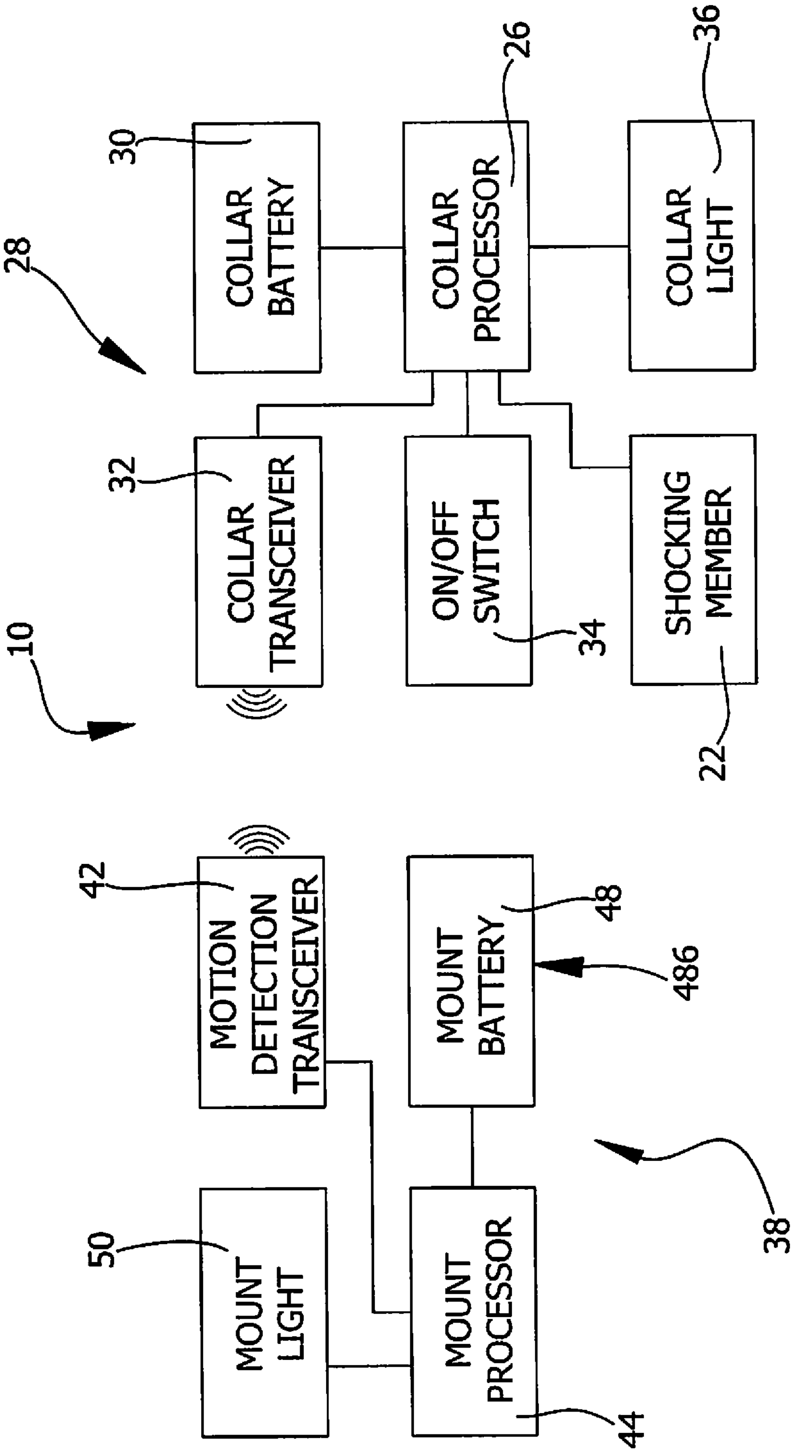
FIG. 8 is a block diagram of an embodiment of the disclosure.

With reference now to the drawings, and in particular to FIGS. 1 through 8 thereof, a new shock collar embodying the principles and concepts of an embodiment of the disclosure and generally designated by the reference numeral 10 will be described.

As best illustrated in FIGS. 1 through 8, the gateway passage prevention system 10 generally comprises a shock module 12 which comprises a collar 14 adapted for mounting to a neck 60 of an animal 58 such as a dog, a cat, or the like. The collar 14 may have an adjustable length via an adjustable buckle 20 or other suitable connector. An electric shock member 22 is mounted on an interior side 16 of the collar 14. The electric shock member 22 may comprise electrical contacts such that an electric potential between the electrical contacts causes a current of electricity to pass through the animal 58 between the electrical contacts.

A casing 24 is mounted to an exterior side 18 of the collar 14 and contains a collar processor 26, a collar power supply 28, and a collar transceiver 32. The collar processor 26 is operatively coupled to the electric shock member 22 and is electrically coupled to the collar power supply 28. For example, the collar processor 26 may be programmed to selectively direct electricity from the collar power supply 28 through the electrical contacts of the electric shock member 22. The collar power supply 28 comprises a collar battery 30 but may comprise a capacitor or other suitable power source. A collar power switch of 34 is mounted to the casing 24 and is actuatable to selectively activate the collar processor 26.

A collar light source 36 is operably coupled to the collar processor 26 and is selectively powered by the collar power supply 28. The collar processor 26 may be programmed to selectively activate the collar light source 36 to indicate operational data corresponding to the shock module 12. For example, the collar processor 26 may activate the collar light source 36 under one or more of the following circumstances: the collar power supply 28 has a charge, the collar power supply 28 has a low charge, the collar processor 26 is activated, the electric shock member 22 is activated.

A sensor module 38 is in wireless communication with the shock module 12. The sensor module 38 comprises a housing 40 which houses a sensor transceiver 42, a sensor processor 44, and a sensor power supply 46. The sensor transceiver 42 is in wireless communication with the collar transceiver 32. The sensor processor 44 is configured to detect a motion of the collar transceiver 32 with respect to the sensor transceiver 42 within a predetermined range of the sensor transceiver 42 and proximate to a gateway 62 such as a doorway, an opening to a hallway, or the like. The sensor processor 44 is programmed to cause the sensor transceiver 42 to transmit an operational signal to the collar processor 26 via the collar transceiver 32 to activate the electric shock member 22 when the motion of the collar transceiver 32 is detected. The motion may be detected by the sensor transceiver 42 by any suitable wireless means. For example, the transceivers 32, 42 may be used with a triangulation algorithm, a trilateration algorithm, or the like.

The sensor power supply 46 is electrically coupled to the sensor processor 44. The sensor power supply 46 comprises a sensor battery 48 but may comprise a sensor capacitor or other suitable power source. A sensor light source 50 is mounted on a front side 52 of the housing 40 and is operably coupled to the sensor processor 44. The sensor processor 44 may be programmed to selectively the sensor light source 50 to indicate operational data corresponding to the sensor module 38. For example, the sensor light source 50 may be activated to indicate one or more of the following conditions: the sensor power source has a charge, the sensor power source has a low charge, the sensor processor 44 is activated, and the sensor processor 44 is operating to cause the electric shock member 22 to activate via wireless signals.

The housing 40 defines a fastener-receiving slot 56 in a rear side 54 of the housing 40 so that the housing 40 may be mounted via a fastener to a support surface 64 such as a wall or a ceiling proximate the gateway 62. The housing 40 may mount to the support surface 64 via a hook-and-loop fastener, a magnetic mount, or other suitable mounting apparatuses.

In use, the housing 40 of the sensor module 38 is mounted to the support surface 64 and the shock module 12 is placed around the neck 60 of the animal 58. When the sensor processor 44 determines via the sensor transceiver 42, the collar transceiver 32, and a suitable tracking algorithm that the shock module 12 is approaching the gateway 62, the sensor processor 44 causes the sensor transceiver 42 to transmit an operational signal to the collar processor 26 via the collar transceiver 32 to activate the electric shock member 22. The electric shock member 22 shocks the animal 58 with sufficient energy to cause discomfort to the animal 58, thereby dissuading the animal 58 from passing through the gateway 62.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A gateway passage prevention system comprising:
- a shock module comprising:
  - a collar configured to mount to a neck of an animal;
  - an electric shock member mounted on an interior side of the collar;
  - a collar processor operatively coupled to the electric shock member, the collar processor being programmed to selectively deliver electric shocks to the electric shock member;
  - a collar power supply electrically coupled to the collar processor;
  - a collar transceiver operably coupled to the collar processor; and
  - a collar light source operably coupled to the collar processor; and
- a sensor module in wireless communication with the shock module, the sensor module comprising:
  - a housing configured to mount to a support surface proximate to a gateway;
  - a sensor transceiver mounted in the housing and in wireless communication with the collar transceiver; and
  - a sensor processor operatively coupled to the sensor transceiver, the sensor processor being configured to detect a motion of the collar transceiver with respect to the sensor transceiver within a predetermined range of the sensor transceiver, the sensor processor being programmed to cause the sensor transceiver to transmit an operational signal to the collar processor via the collar transceiver to activate the electric shock member when the motion of the collar transceiver is detected.

2. The system of claim 1, wherein the collar power supply comprises a collar battery.

3. The system of claim 1, wherein the shock module further comprises a power switch operatively coupled to the collar processor, the power switch being actuatable to alternately activate and deactivate the collar processor.

4. The system of claim 1, wherein the housing of the sensor module defines a fastener-receiving slot in a rear side of the housing wherein the housing is configured to mount to the support surface proximate the gateway via a fastener.

5. The system of claim 1, wherein the sensor module further comprises a sensor power supply electrically coupled to the sensor processor.

6. The system of claim 5, wherein the sensor power supply comprises a sensor battery.

7. A gateway passage prevention system comprising:

a shock module comprising:

a collar configured to mount to a neck of an animal;

an electric shock member mounted on an interior side of the collar;

a collar processor operatively coupled to the electric shock member, the collar processor being programmed to selectively deliver electric shocks to the electric shock member;

a collar power supply electrically coupled to the collar processor; and a collar transceiver operably coupled to the collar processor; and a sensor module in wireless communication with the shock module, the sensor module comprising:

a housing configured to mount to a support surface proximate to a gateway;

a sensor transceiver mounted in the housing and in wireless communication with the collar transceiver;

a sensor processor operatively coupled to the sensor transceiver, the sensor processor being configured to detect a motion of the collar transceiver with respect to the sensor transceiver within a predetermined range of the sensor transceiver, the sensor processor being programmed to cause the sensor transceiver to transmit an operational signal to the collar processor via the collar transceiver to activate the electric shock member when the motion of the collar transceiver is detected; and a sensor light source mounted on the housing and operably coupled to the sensor processor.

8. A gateway passage prevention system comprising:

a shock module comprising:

a collar configured to mount to a neck of an animal;

an electric shock member mounted on an interior side of the collar;

a collar processor operatively coupled to the electric shock member, the collar processor being programmed to selectively deliver electric shocks to the electric shock member;

a collar power supply electrically coupled to the collar processor, the collar power supply comprising a collar battery;

a collar transceiver operably coupled to the collar processor;

a power switch operatively coupled to the collar processor, the power switch being actuatable to alternately activate and deactivate the collar processor; and a collar light source operably coupled to the collar processor; and a sensor module in wireless communication with the shock module, the sensor module comprising:

a housing, the housing defining a fastener-receiving slot in a rear side of the housing wherein the housing is configured to mount to a support surface proximate a gateway via a fastener;

a sensor transceiver mounted in the housing and in wireless communication with the collar transceiver;

a sensor processor operatively coupled to the sensor transceiver, the sensor processor being configured to detect a motion of the collar transceiver with respect to the sensor transceiver within a predetermined range of the sensor transceiver, the sensor processor being programmed to cause the sensor transceiver to transmit an operational signal to the collar processor via the collar transceiver to activate the electric shock member when the motion of the collar transceiver is detected;

a sensor power supply electrically coupled to the sensor processor, the sensor power supply comprising a sensor battery; and a sensor light source mounted on the housing and operably coupled to the sensor processor.

* * * * *